June 15, 1937.  W. J. CLEMENTS  2,083,688
BEARING GUARD AND OIL RETRIEVER
Filed Nov. 15, 1935  2 Sheets-Sheet 1
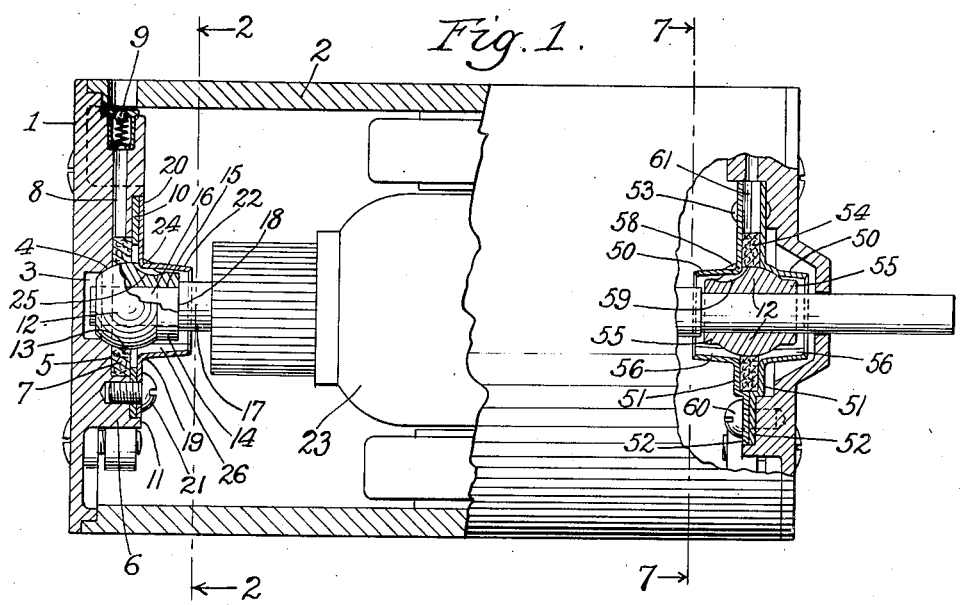
Fig. 1.
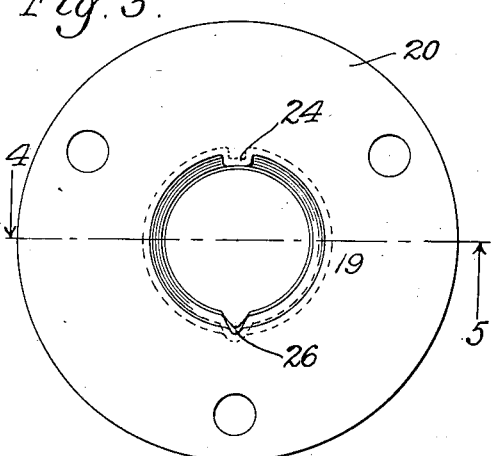
Fig. 3.
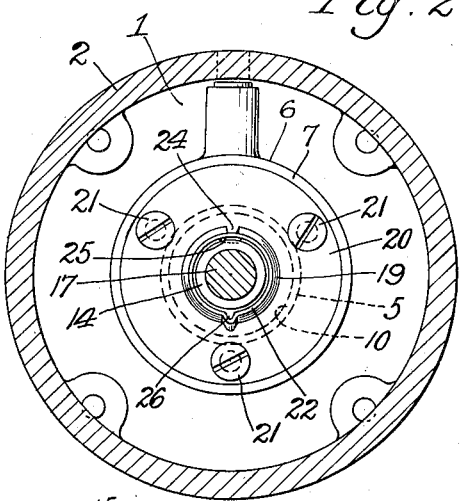
Fig. 2.
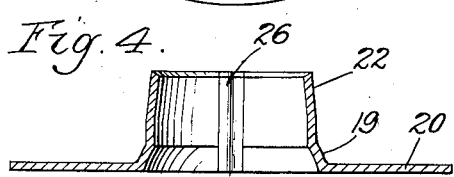
Fig. 4.
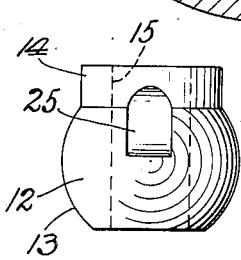
Fig. 6.
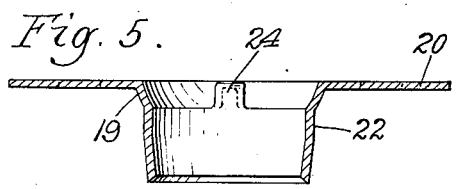
Fig. 5.
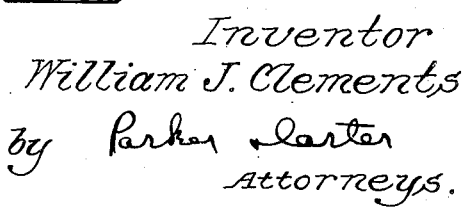
Inventor
William J. Clements
by Parker Carter
Attorneys.

June 15, 1937.  W. J. CLEMENTS  2,083,688
BEARING GUARD AND OIL RETRIEVER
Filed Nov. 15, 1935  2 Sheets-Sheet 2

Inventor
William J. Clements
by Parker & Carter
Attorneys.

Patented June 15, 1937

2,083,688

UNITED STATES PATENT OFFICE 2,083,688

BEARING GUARD AND OIL RETRIEVER

William J. Clements, Chicago, Ill., assignor to Clements Mfg. Co., Chicago, Ill., a corporation of Illinois Application November 15, 1935, Serial No. 49,898

7 Claims. (Cl. 308—36.1)

My invention relates to an improvement in bearing guards or oil retrievers and has for one purpose to prevent the splattering of oil from shaft bearings. Another purpose is the provision of means for directing back to the bearing oil which may tend to escape therefrom. Another purpose is the provision of means for preventing the escape of oil into the motor housing. Another object is the provision of improved means for preventing the rotation of a self-aligning bearing, while permitting its normal aligning movement with the shaft. Other objects will appear from time to time in the course of the specification and claims.

I illustrate my invention more or less diagrammatically in the accompanying drawings, wherein—

Figure 1 is a side elevation of an electric motor with parts omitted and parts in section to show the bearing;

Figure 2 is a section at the line 2—2 of Figure 1;

Figure 3 is an enlarged detail;

Figure 4 is a section at the line 4—5 of Figure 3;

Figure 5 is a section at the line 4—5 of Figure 3, looking in the direction opposite that of Figure 4;

Figure 6 is an enlarged detail view of the bearing member;

Like parts are indicated by like symbols throughout the specification and drawings.

Figure 7:
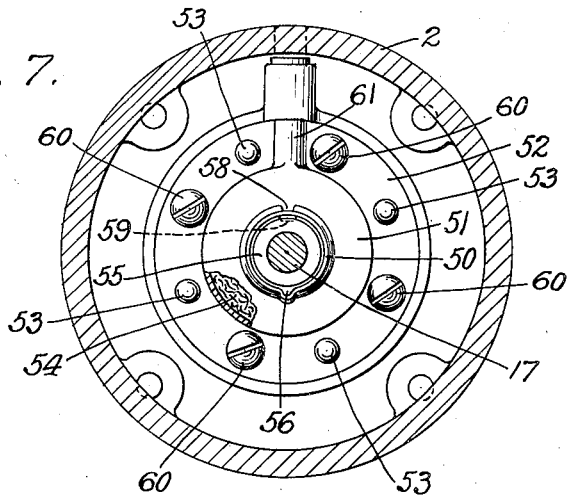
Figure 7 is a section at the line 7—7 of Figure 1.

Referring to the drawings, I illustrate my invention as applied to a motor armature shaft but it will be realized that it may be applied to a wide variety of shafts and for a wide variety of purposes. In the particular application herewith, however, I employ an end plate 1 of a motor housing 2 which has a socket 3 formed therein, said socket having a spherical bearing surface 4. Surrounding this socket and spherical surface is an oil containing cavity 5. The cavity and the socket may both be contained within an inwardly extending boss or enlargement 6. 7 indicates a ring or mass of any suitable oil-containing fiber. 8 is a passage extending to the cavity 5 in which this fibrous packing 7 is positioned. Any suitable means may be employed for controlling the admission of oil to said passage, for example, the usual spring thrust ball 9. 10 is a gasket overlying the fibrous packing 7 and centered by the rim 11 of the said boss 6.

12 is the bearing member proper shown as having a generally spherical bearing surface portion 13 and a generally cylindrical sleeve portion 14 extending therefrom, there being a central aperture 15 to receive the end 16 of any suitable shaft 17. The shoulder 18 of said shaft may abut against the cylindrical end portion 14 of said bearing member. It will be understood that the bearing member moves in a ball and socket relationship with the opposed spherical bearing surface 4 of the boss or end plate. The bearing member is preferably made of more or less porous metal, the supply of oil being constantly kept in juxtaposition with the exterior of the bearing member, and passing therethrough to the bearing surface proper 15.

19 generally indicates a guard member which includes a flat ring or plate 20, overlying the gasket 10. The proportion of parts is preferably such that when the plate 20 is in position and is screwed down by the screws 21 it is substantially flush with the rim 11. This plate has an inwardly extending sleeve 22 which extends along the bearing member 12 and the cylindrical portion thereof, and preferably extends even farther out to surround the outer end portion of the shaft adjacent the shoulder 18. I illustrate the shaft 17 as a motor armature shaft and the armature structure is generally indicated at 23. The sleeve 22 of the guard is provided with an inward extension, notched or upset, as at 24, which interpenetrates with a channel or aperture 25 in the side of the spherical portion 13 of the bearing member 12. When the plate 20 is locked in position, this portion 24, interpenetrating with the aperture or notch 25 of the bearing, prevents rotation of the bearing member 12, while permitting it readily to gyrate or otherwise move in order to maintain its normal desired alignment with the shaft 17 as the said shaft may vary its axis.

In practice it may happen that there will be a splatter or leakage of oil about the outer end of the cylindrical sleeve portion 14 of the bearing, or oil may be centrifugally thrown from the end of the shaft 17. Therefore, the sleeve 22 of the guard is built or extended out far enough to overlap with this splatter zone and the oil so received may run back to the fiber packing 7 along the gutter 26. Whereas only one gutter is shown, it will be understood that any suitable number may be employed.

Figure 8:
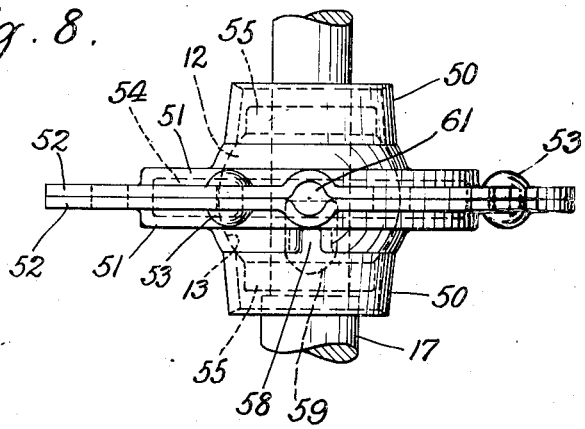
Figure 8 is a detail edge elevation of one of the bearings removed from the motor.

Referring to Figures 7 and 8, it will be observed that I provide for a return of oil from both ends of the bearing. With this bearing I employ a pair of tapered sleeves 50, each of which has associated with it an expanded portion 51 which in turn terminates in a flat ring 52. The rings 52 may be riveted together or otherwise secured as at 53. When the two parts are so connected it will be observed, as in Figure 7, that the parts 51 define a space into which any suitable washer or oil containing member or ring 54 may be inserted. When this type of bearing is employed the bearing member proper 12 is employed with two oppositely extending sleeves 55. The oil which escapes about the end of the shaft at the end of each of these sleeves drips upon or is splattered against one or the other of the sleeves 50 and drains back along gutters 56 to the ring 54. Any suitable shoulder or inward projection may be formed on one of the members 50, as at 58, to penetrate an aperture 59 in the member 12. In applying the double shield to the motor, as shown at the right end of Figure 1, I have illustrated the shield and motor assembly as held in place by four screws 60 and four rivets 53, which hold the assembly together. At the top the flanges 52 are shown as expanded to form an oil inlet passage 61.

It will be understood that wide variations may be made in the shape of the bearing member itself without departing from the spirit of my invention. For instance, it may be made squared instead of spherical. I therefore wish my drawings and description to be taken as in a broad sense illustrative and diagrammatic rather than as limiting me to my specific showing.

The use and operation of my invention are as follows:

The bearing member generally indicated as 12, receives the reduced end of the shaft 17. It has a ball and socket engagement with the bearing surface 4 and permits the bearing member as a whole to align itself with minor variations of location of the axis of rotation of the shaft 17. The bearing member is preferably made of more or less porous metal whereby oil from the packing 7 seeps through the bearing member and lubricates the bearing surface proper 15. There may be some drippage of oil about the shaft 17 or from the end of the sleeve 14 of the bearing member. Such oil may either drip or may be centrifugally thrown by the rotation of the shaft. It is important in the first place that this oil be not wasted and in the second place that it be not spattered in the interior of the housing. I therefore provide the sleeve or guard member 22 extending from the flat plate 20 and provided with a gutter 26. Therefore, the oil is returned by this inclined gutter back to the oil receiving packing 7. The member 19 has the additional two functions, however, as serving in the first place as a confining or securing means for the packing 7, the gasket 10 and the bearing member 12. Also, the upset portion 24 penetrates the aperture or notch 25 of the bearing member 12 and prevents its rotation, while permitting it to wobble or gyrate so far as is necessary to maintain its self-aligning characteristics. This prevention of rotation is important in connection with preventing wear of the exterior of the member 12, which wear might result in substantial misalignment of the bearing in relation to the plate 1. Whereas I have shown but one gutter 26 it will be realized that a plurality may be employed. Whereas I have shown the member 12 as having a ball and socket relationship with the opposed bearing 4 it will be realized that a wide variety of shapes may be employed. The application of my invention to a motor shaft is for purpose of illustration. It will be realized that the sleeve 22 may be extended as far out as is necessary to catch oil and may, if desired, be extended out so far as to overlap or interpenetrate with the motor structure.

I claim:

1. A unitary bearing member and a shaft rotating therein, oil containing means exteriorly associated with said bearing member, a shield surrounding said bearing member and shaft, and positioned in the line of delivery of oil escaping from said bearing member and shaft, and means associated therewith for returning the escaping oil to said oil containing means, a plate in which said bearing member is seated, a ball and socket connection between said bearing member and plate, said plate including an aperture adapted to receive said oil containing means, said shield including a securing member adapted to be secured to said plate and to confine said oil containing means, and a sleeve extending axially along said bearing member and shaft.

2. In a bearing structure, a supporting member, a bearing member, a shaft rotatably mounted in the bearing member, said bearing member being movable in relation to said supporting member in response to movement of said shaft, and a shield surrounding said bearing member and shaft and secured to said support, said shield including a portion interpenetrating with said bearing member and adapted to prevent rotation of said bearing member, while permitting it a limited movement in relation to said support, oiling means associated with said bearing member, and means associated with said shield for returning escaped oil to said oiling means, said shield including a sleeve portion extending axially along said shaft, and gutter means formed in said sleeve portion.

3. A bearing member and a shaft rotating therein, oil containing means exteriorly associated with said bearing member, a shield surrounding said bearing member and shaft, and positioned in the zone of delivery of oil escaping in the zone of delivery of oil escaping from said bearing member and shaft, said shield including a plurality of sleeves extending outwardly in opposite directions, said sleeves surrounding but being spaced from the exterior of said bearing member, and extending outwardly along said shaft, beyond said bearing member, and in close proximity to said shaft, said sleeves having gutter members formed therein, adapted to return oil to said oil containing means.

4. A bearing member and a shaft rotating therein, oil containing means exteriorly associated with said bearing member, a shield surrounding said bearing member and shaft, and positioned in the zone of delivery of oil escaping in the zone of delivery of oil escaping from said bearing member and shaft, said shield including a plurality of sleeves extending outwardly in opposite directions, said sleeves surrounding but being spaced from the exterior of said bearing member, and extending outwardly along said shaft, beyond said bearing member, and in close proximity to said shaft, said sleeves having gutter members formed therein, adapted to return oil to said oil containing means, and an oil absorbent member interposed between the shield and the bearing member.

5. A bearing member and a shaft rotating therein, oil containing means exteriorly associated with said bearing member, a shield surrounding said bearing member and shaft, and positioned in the zone of delivery of oil escaping in the zone of delivery of oil escaping from said bearing member and shaft, said shield including a plurality of sleeves extending outwardly in opposite directions, said sleeves surrounding but being spaced from the exterior of said bearing member, and extending outwardly along said shaft, beyond said bearing member, and in close proximity to said shaft, said sleeves having gutter members formed therein, adapted to return oil to said oil containing means, and an oil absorbent member interposed between the shield and the bearing member, said shield being provided with an enlarged portion in which said oil receiving member is seated.

6. In combination, a spherical socket element, a spherical bearing member opposed thereto, a shaft in said bearing member, said bearing member being of porous material, an oil containing packing surrounding said bearing member and in contact with its exterior, and a unitary shield member, secured to said socket member, and extending in the line of delivery of oil escaping from said bearing member and shaft, said shield member including a portion inclined downwardly toward said oil containing member, and having formed therein a portion adapted to prevent rotation of said bearing member.

7. In combination, a spherical socket element, a spherical bearing member opposed thereto, a shaft in said bearing member, said bearing member being of porous material, an oil containing packing surrounding said bearing member and in contact with its exterior, and a unitary shield member, secured to said socket member, and extending in the line of delivery of oil escaping from said bearing member and shaft, said shield member including a portion inclined downwardly toward said oil containing member, and having formed therein a portion adapted to prevent rotation of said bearing member, said shield member also including a closure plate adapted to form, with the socket element, a housing for the oil containing member.

WILLIAM J. CLEMENTS.